United States Patent Office 2,768,066
Patented Oct. 23, 1956

2,768,066

MANUFACTURE OF HYDROGEN PEROXIDE

Lynn H. Dawsey and Robert R. Umhoefer, Kenmore, N. Y., assignors, by mesne assignments, to Food Machinery and Chemical Corporation, San Jose, Calif., a corporation of Delaware No Drawing. Application February 1, 1952,
Serial No. 269,604

1 Claim. (Cl. 23—207)

The present invention relates to the production of hydrogen peroxide by cyclic hydrogenation and oxidation of alkylated anthraquinones or tetrahydroalkylated anthraquinones in an improved solvent medium.

It has been proposed to produce hydrogen peroxide from hydrogen and oxygen gases through alternate oxidation and reduction of alkylated anthraquinones dissolved in organic solution. The production of the hydrogen peroxide by this process proceeded in two main stages: (1) the hydrogenation stage where the alkylated quinone was reduced to the alkylated hydroquinone and (2) the oxidation stage where the alkylated hydroquinone was oxidized to the quinone, hydrogen peroxide splitting off during this operation. After separation of the hydrogen peroxide and the purification of the solution, the cycle of the two stages was repeated. This type of procedure has been described in U. S. Patent 2,215,883, and its commercial application in PB Report 395.

In this prior method of manufacture, a mixed solvent was suggested as the reaction medium consisting of a constituent capable of dissolving the quinone material and a constituent capable of dissolving the hydroquinone material. The practical result achieved was that the working compound in the solution could be ultimately oxidized and reduced in cyclic fashion in the liquid phase without separation of either the quinone or hydroquinone form of the working material. The quinone solvent normally employed has been an ether, a hydrocarbon (usually benzene) or similar solvent of high vapor pressure and, therefore, inflammable. Such hydrocarbons have practically zero dissolving power for the hydroquinone form of the working compound, but excellent dissolving power for the quinone form. The hydroquinone solvent component has consisted of the higher aliphatic alcohols. However, the solubility of the hydroquinones in the higher alcohols is not very great and this limits the amount of hydroquinone that can be treated or worked per cycle which, in turn, limits the amount of hydrogen peroxide that can be produced per cycle. General experience in operation of the prior process, as outlined in the literature cited above, indicates that about 40% of dissolved compound may be successfully worked with the realization of hydrogen peroxide concentrations of about 5.5 grams per liter in the organic solution, after the oxidation phase of the cycle.

In producing hydrogen peroxide from the hydroquinones and particularly the alkylated hydroquinones or the corresponding tetrahydroalkylated hydroquinones, it has been necessary heretofore to utilize relatively pure oxygen and it has been necessary to carry out the oxidation in closed systems to prevent excessive loss of solvent. It has not been possible to use free air to render the mixture less liable to explosion and fire hazard by reason of volatility of the generally employed solvents, such as benzene, anisole, combustible alcohols and the like. Although the preparation of hydrogen peroxide by auto-oxidation processes appears to be economically favorable when carried out upon a limited scale, the operational hazards presented by the explosive vapors and the disadvantage connected with oxidation in a closed system with oxygen on a large scale, renders the whole process impractical.

Contrasted with the German practice of using an alcohol in combination with a hydrocarbon as a rather volatile solvent mixture in which to work 2-ethylanthraquinone, Dawsey et al. in U. S. 2,455,238 more recently described certain nonvolatile dibasic acid esters as possessing advantages over the less permanent materials initially suggested in U. S. 2,215,883. Using an ester as a single solvent, it was possible to greatly reduce the cost of raw materials in making hydrogen peroxide. Oxygen gas was eliminated and replaced with comparatively cheap air. Evaporation losses of volatile materials, like benzene and hexyl alcohol, were eliminated. The accompanying explosion and fire hazards connected with working the voltile organic materials was eliminated giving a safe, simple and cheap process. Dibutyl sebacate was cited as an example of such a permanent type solvent.

The present invention relates to improvements over the basic process described initially in U. S. 2,158,525 and U. S. 2,215,883 wherein hydrogen peroxide is made by working a mixture containing two solvents. The novelty of the present invention resides in the discovery of a new class of quinone solvents. We make no claims towards improvement in the hydroquinone solvent component of the work solution since that has already been made the subject of other patents. See U. S. 2,537,516 and 2,537,655. This invention relates specifically to improvement in the quinone solvent component of the work solution; especially in compounding chemically stable, non-volatile and permanent work solutions which resist deterioration and loss over long periods of time.

It is an object of the invention to produce hydrogen peroxide from alkylated anthraquinones or the tetrahydro-anthraquinones contained in a non-volatile organic work solution, wherein the oxidation step in the process may be carried out with air which is an extremely cheap raw material.

It is an object of the present invention to produce hydrogen peroxide from quinone type materials without the attendant explosion hazard heretofore present.

It is also an object of the invention to provide an improved solvent medium for such auto-oxidation process having great solvent power for the quinone constituent and as an ancillary object to improve the amount of hydrogen peroxide produced per operating cycle.

In accordance with the present invention, we have discovered that diphenyl and certain related hydrocarbon derivatives possess both remarkable permanence and high solvent action on quinones. These substances exhibit little or no solvency for the corresponding hydroquinones, so they must be blended with another solvent having high specific solubility for the hydroquinone in order to give an operable work solution. This new class of quinone solvents consists of hydrocarbon compounds, all of which are characterized by the presence of two benzene nuclei in the molecule. Diphenyl is structurally the simplest member of the class which also includes the alkyl diphenyls and isomers of the alkyl diphenyls. The class is restricted operably by reason of increasing viscosity and decreasing solubility of the quinone to hydrocarbons containing a total of not less than 10 nor more than 18 carbon atoms in the molecule, including the two phenyl groups which must be present. The class is further restricted to those hydrocarbon compounds which are completely saturated with regard to structure except for the two phenyl groups. The molecular weights may range between 154 and 240; boiling points are all above 250° C. Specific gravities range between 0.95 and 1.00. All members of the class have vapor pressures below 1 mm. Hg at room temperatures; many have practically zero vapor pressure. Viscosities of the liquid members at 25° C. may range between 2 and 30 centipoises, although liquids with viscosities in the lower part of such range, below 10 centipoises are preferred. These quinone solvents may be solids as well as liquids, when in the pure state, provided such solids remain dissolved when compounded with the other components used in making up the work solution (see Example 1).

Typical examples of some of the compounds falling within the general classification are as follows: Diphenyl, methyldiphenyl, bitolyl, amyldiphenyl, diphenylmethane, diphenylethane, dibenzyl, methydibenzyl, ditolylethane, etc.

All members of the class are substantially and mutually insoluble with water, but are readily miscible with most organic solvents. Since they are not esters but hydrocarbons, they are not affected by water or dilute acids or strong alkali under ordinary conditions. However, they can be sulfonated or nitrated with the corresponding concentrated acids. They are chemically stable toward oxygen and peroxides under the conditions encountered in the anthraquinone auto-oxidation process for making hydrogen peroxide.

Solvents within this so-called "diphenyl hydrocarbon class" have exceptional dissolving power for the alkylated anthraquinones, as well as the corresponding tetrahydroalkylated anthraquinones. The following table lists the properties of five typical solvents, together with th solubility of 2-ethylanthraquinone in each:

TABLE I

| Solvent | Formula | Boiling Range, °C. | Viscosity, Centipoises, 25° C. | Flash Point, °F. | Quinone Solubility, g./L. Solvent | |
|---|---|---|---|---|---|---|
| | | | | | 20° C. | 40° C. |
| Diphenyl [1] | $C_{12}H_{10}$ | 254-5 | | 234 | 344 | 404 |
| Diphenylmethane. | $C_{13}H_{12}$ | 261 | 3 | 238 | 180 | 333 |
| 1,1-Diphenylethane. | $C_{14}H_{14}$ | 272 | 4 | 243 | 159 | 280 |
| 1-Methyldibenzyl. | $C_{15}H_{16}$ | 280-4 | 5 | 256 | 128 | 244 |
| 11,1-Ditolylethane. | $C_{16}H_{20}$ | 295-300 | 9 | 270 | 120 | 211 |
| Amyldiphenyl. [2] | $C_{17}H_{20}$ | 314-38 | 21 | 300 | 96 | 151 |

[1] Specific gravity and quinone solubility calculated for diphenyl in solution.
[2] Commercial mixture of isomers.

The "diphenyl" hydrocarbons are applicable in the working of other compounds besides 2-ethylanthraquinone in the auto-oxidation process for making hydrogen peroxide. Generally speaking, the solubility of 2-methylanthraquinone, in these hydrocarbons is about one-quarter that of the 2-ethyl compound; on the other hand, 2-isopropylanthraquinone and 2-tert.-butylanthraquinone are considerably more soluble than the 2-ethylanthraquinone. In the case of the tetrahydro derivatives of the anthraquinones, tetrahydroanthraquinone and 2-methyl-tetrahydroanthraquinone are about one-half as soluble as 2-ethylanthraquinone; 2-ethyltetrahydroanthraquinone is about four-fifths as soluble as 2-ethylanthraquinone.

Whereas we specify diphenyl and hydrocarbon isomers of the alkyl diphenyls containing from 12 to 18 carbon atoms, with molecular weights in the range between 154 and 240, we prefer a solvent compound containing short side chains since solubility decreases with the length and number of substituent groups added to the two phenyl nuclei. It is, of course, evident from the foregoing, that mixtures of different diphenyls are both possible and workable. It is also evident that they may be blended with an inert organic diluent to produce a mixture having a high quinone solvency.

The following experimental examples illustrate the successful working of solutions employing the diphenyl hydrocarbon solvents. In considering these illustrations, it must be remembered that the hydroquinone solvent component, which is either a phosphate or an alcohol, has a limited dissolving power for the quinone and any quinone which may be worked is largely due to the dissolving power of the diphenyls. Further, the examples are merely illustrative of the principles of the invention and are not to be deemed limitative thereof, as other alkylated anthraquinones may be employed in lieu of 2-ethylanthraquinone specifically illustrated as the working compound.

*Example 1.—Diphenyl*

A solution was made up consisting of 591 grams of diphenyl, 320 grams of 2-ethylanthraquinone, 952 grams of triphenylphosphate and 822 grams of diphenyloctylphosphate, giving a total volume of 2360 cc. with a specific gravity 1.137 and a quinone concentration of 135 grams per liter. The viscosity of this solution was 13.8 centipoise at 25° C. The flash point was 148° C. by the open cup method. The solution was just saturated with the quinone when held at 25° C. It was purified by washing with a 50% aqueous solution of potassium carbonate, rejecting the aqueous wash and passing the oil through a bed of 100 mesh activated alumina. The dry solution was then shaken with 40% aqueous $K_2CO_3$ solution followed by another filtration to remove the aqueous cloud caused by the latter carbonate treatment.

2000 cc. of the purified solution was hydrogenated at 36° C. with 20 grams of porous nickel catalyst in a spherical, 3-liter, glass reaction vessel which was equipped with a 1-inch diameter turbine agitator driven at 1500 R. P. M. During a period of 142 minutes, 17.1 liters of hydrogen gas was absorbed, measured at 25° C. and 750 mm. of Hg pressure, which was the calculated amount required to reduce 60% of the quinone present into the hydroquinone. The agitator was stopped, the reduced solution and catalyst were drained out of the hydrogenating vessel, through a cock sealed in the bottom of the vessel, thence through a medium porosity, 90 mm. diameter, sintered glass filter where the catalyst was retained and into a 3-liter glass oxidizing vessel, which was held under nitrogen atmosphere, and which was an exact duplicate of the hydrogenating vessel with regard to its construction. The nitrogen in the oxidation vessel was flushed out with air, after raising the temperature in the vessel to 36° C. and the reduced solution was oxidized at 36° C. with agitator running at 1500 R. P. M. Oxygen absorbed from the air atmosphere within the oxidizer was constantly replaced with pure, metered oxygen gas. After 135 minutes, oxygen absorption ceased abruptly with a change in color of the solution, to yellow. The quantity of oxygen consumed with 16.38 liters, measured at 25° C. and 750 mm. Hg. pressure. The hydrogen peroxide dissolved in the solution was extracted by washing five successive times with 200 cc. portions of water. The hydrogen peroxide recovered was 22.34 grams. The volume of work solution treated in the oxidizer was then measured and found to be 1980 cc. According to these figures, the oxygen consumption should have been 16.93 liters, whereas the actual uptake was 16.38 liters. This corresponds to 3.2% loss of hydrogen which is assumed to have gone toward the formation of ethyltetrahydroanthraquinone during hydrogenation. Of the total oxygen used, 99.3% was recovered in the form of hydrogen peroxide. The overall efficiency of hydrogen gas into hydrogen peroxide was 96.0%. According to this example, the concentration of hydrogen peroxide produced before extraction amounted to 11.3 grams per liter of work solution; that is, over twice the concentration (5.5 grams per liter) possible according to the earlier practice referred to herein, where benzene and alcohols were employed in solution make-up. This marked increase in the hydrogen peroxide production capacity is due in part to a simple substitution of diphenyl in place of the heretofore used benzene, in solution make-up.

The high flash point of this solution places it well out of the range of hazardous work materials. With an operating temperature of 36° C. in the oxidation vessel, working of this solution with flash point of 148° C. involved no risk of accidental ignition of vapors within the vessel. In comparison, however, the benzene-alcohol work solutions cited in the prior art have flash points of about —5° C. The fire point is within the range of the actual operating temperature. Explosions with loss of life have been recorded in the past where benzene was employed as a solvent in the production of hydrogen peroxide by the anthraquinone process.

The next example illustrates the practice of the invention wherein a diphenyl hydrocarbon is compounded with a higher alcohol, in place of a phosphate hydroquinone solvent.

*Example II.—Diphenylmethane*

A solvent mixture was made up consisting of 1000 cc. of diphenylmethane and 1000 cc. of commercial tetradecanol, to give a 2000 cc. volume having a specific gravity of 0.918. In this mixture, 220 grams of 2-ethylanthraquinone was dissolved to give a work solution of 2179 cc. volume, with a specific gravity of 0.943 and a quinone concentration of 101 grams per liter. The work solution containing the quinone was then further purified by shaking with aqueous 50% KOH, in a separatory funnel, followed by filtration through a layer of activated alumina. It was then shaken with an aqueous 40% $K_2CO_3$ solution followed by another filtration to remove the aqueous cloud caused by this carbonate treatment. The final solution had a viscosity of 4.6 centipoises, at 25° C., and a flash point of 117° C. in air. The solution was just saturated with regard to the quinone when it was held at a temperature of 25° C.

1960 cc. of the purified solution was hydrogenated in the same apparatus and under the same conditions as described in Example I, with the exception that 6.0 grams of catalyst was used to cause the absorption of 9.64 liters of hydrogen during a 67-minute period. The absorbed hydrogen was the quantity required to reduce 45% of the quinone present to the hydroquinone. 1930 cc. of the reduced solution was filtered into the oxidation vessel and likewise oxidized, as in Example I, with the consumption of 8.21 liters of oxygen during a period of 52 minutes. The work solution was extracted with water, as before, yielding 11.6 grams of hydrogen peroxide. According to these figures, the oxygen absorption should have been 9.52 liters, whereas the actual uptake was 8.21 liters. This corresponds to 14% hydrogen loss which is assumed to have gone toward the formation of ethyltetrahydroanthraquinone during hydrogenation. The overall efficiency of hydrogen gas into hydrogen peroxide was 90%.

The concentration of hydrogen peroxide produced in the work solution, before extraction, amounted to 6.0 grams per liter which is about the same as that possible with the benzene-alcohol work solutions of the prior art; however, the high flash point shown by the work solution in this example, places it well within the class of safe media under actual oxidizing conditions, as contrasted with the low flash point characteristic of the benzene-alcohol work solutions cited in the prior art, which classifies the latter as a hazardous work medium.

*Example III.—Ditolylethane*

A solvent mixture was made up, consisting of 1400 cc. of purified ditolylethane and 600 cc. of commercial trioctylphosphate to give a 200 cc. volume having a specific gravity of 0.966. In this mixture, 176 grams of 2-ethylanthraquinone was dissolved to give a work solution of 2143 cc. volume of specific gravity 0.984 and a quinone concentration of 82 grams per liter. The flash point tested 153° C. The viscosity was 12.2 centipoises at 25° C. On continued standing, the quinone separated provided that the temperature was held below 24° C.

The solution was pretreated as in Example II to purify it before hydrogenation. 2000 cc. was hydrogenated in the same apparatus and under the same conditions as described in Example I, with the exception that 6 grams of catalyst was used to cause the absorption of 12.08 liters of hydrogen during an 80-minute period. The hydrogen absorbed corresponded to a reduction of 70% of the quinone present to the hydroquinone. 1980 cc. of the reduced solution was filtered into the oxidation vessel and oxidized under air, as in Example I, with the consumption of 10.32 liters of oxygen during a 115-minute period. The work solution was extracted with water, as before, yielding 13.65 grams of hydrogen peroxide. According to these figures, the oxygen absorption should have been 12.02 liters, whereas the actual uptake was 10.32 liters. This corresponds to a 14% hydrogen loss which is assumed to have gone toward the formation of ethyltetrahydroanthraquinone during the hydrogenation. Of the total oxygen used, 97% was extracted as hydrogen peroxide. The overall efficiency of hydrogen into hydrogen peroxide was 83%.

The concentration of hydrogen peroxide in the work solution before extraction was 6.9 grams per liter, representing a 25% gain in work capacity of this solution over a similar work solution compounded with the hitherto used benzene as quinone solvent. The high flash point exhibited by this solution places it in a "safe" category. Another advantage of prime practical importance illustrated is the possibility of working the oxidation step with air under ordinary pressures in an open system.

*Example IV.—1-methyldibenzyl*

A solvent mixture was made up, consisting of 1400 cc. of purified 1-methyldibenzyl and 600 cc. of commercial trioctylphosphate to give a 2000 cc. volume having a specific gravity of 0.962. In this mixture was dissolved 204 grams of 2-ethylanthraquinone to give a work solution of 2166 cc. volume of specific gravity 0.983. The concentration of the quinone was 94 grams per liter. The dissolving point for the anthraquinone compound in this solution was 27° C. The viscosity was 7.1 centipoises at 25° C. The flash point in air tested 135° C. by the open cup method. The solution was further purified with 50% KOH and with 40% $K_2CO_3$, as explained for the solution in Example II.

1940 cc. was hydrogenated in the same apparatus and under the same conditions as described in Example I with the exception that 11.64 liters of hydrogen was absorbed in a 150-minute period with 6 grams of catalyst. The absorbed hydrogen corresponded to a 59.6% reduction of the total quinones present into the hydroquinones. 1925 cc. of the reduced solution was filtered into the oxidizer and oxidized under air, as in Example I, with the consumption of 8.13 liters of oxygen during a 60-minute period. Upon extraction, the work solution yielded 11.0 grams of hydrogen peroxide. According to these figures, the oxygen absorption corresponded to 70% of the hydrogen absorption; therefore, considerable quinone was further converted to tetrahydroquinone in the hydrogenation of this solution. Of the total oxygen used, 99% was recovered as hydrogen peroxide. The overall efficiency from hydrogen to hydrogen peroxide was 69.5%.

The concentration of hydrogen peroxide in the work solution before extraction was 5.7 grams per liter, which is about equal to that possible with a similar work solution compounded with the hitherto used benzene and alcohol solvents.

The high flash point exhibited by this solution, together with its very low volatility, marks it as an outstanding working medium for use in the continuous cyclic production of hydrogen peroxide, especially during the oxidation phase of the cycle where great practical advantage is illustrated by the use of air as the source of oxygen.

From the foregoing, it will be seen that the present invention provides a new class of quinone solvents of great permanence and therefore of considerable economic value in the manufacture of hydrogen peroxide according to the anthraquinone auto-oxidation process.

What is claimed is:

In the process for making hydrogen peroxide by reduction and auto-oxidation of a working material selected from the group consisting of the alkylated anthraquinones and their tetrahydro derivatives, dissolved in a two-component solvent mixture consisting of a quinone solvent and a hydroquinone solvent and in which solvent mixture hydrogen peroxide is soluble and is subsequently extracted with water, the improvement which comprises employing diphenyl as a constituent of the solvent mixture for dissolving the quinone form of the working material.

References Cited in the file of this patent

UNITED STATES PATENTS

| | | |
|---|---|---|
| 2,059,569 | Filson et al. | Nov. 3, 1936 |
| 2,144,341 | Michalek et al. | Jan. 17, 1939 |
| 2,215,883 | Riedl et al. | Sept. 24, 1940 |
| 2,537,516 | Dawsey et al. | Jan. 9, 1951 |
| 2,537,655 | Dawsey et al. | Jan. 9, 1951 |

FOREIGN PATENTS

| | | |
|---|---|---|
| 671,318 | Germany | Oct. 14, 1941 |